(12) United States Patent
Kolmykov-Zotov et al.

(10) Patent No.: US 7,886,236 B2
(45) Date of Patent: Feb. 8, 2011

(54) DYNAMIC FEEDBACK FOR GESTURES

(75) Inventors: Alexander J Kolmykov-Zotov, Sammamish, WA (US); Shiraz Somji, Kenmore, WA (US); Matt Lerner, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 803 days.

(21) Appl. No.: 10/401,903

(22) Filed: Mar. 28, 2003

(65) Prior Publication Data

US 2005/0275638 A1    Dec. 15, 2005

(51) Int. Cl.
*G06F 3/00* (2006.01)
(52) U.S. Cl. .................. 715/863; 715/856; 715/857; 715/858; 715/859; 715/860; 715/862; 715/864
(58) Field of Classification Search .......... 715/856–864
See application file for complete search history.

(56) References Cited

U.S. PATENT DOCUMENTS

| | | | |
|---|---|---|---|
| 4,866,646 A | 9/1989 | Nakamura et al. | |
| 5,347,295 A * | 9/1994 | Agulnick et al. | 345/156 |
| 5,592,608 A * | 1/1997 | Weber et al. | 715/863 |
| 5,767,457 A | 6/1998 | Gerpheide et al. | |
| 5,841,901 A * | 11/1998 | Arai et al. | 382/187 |
| 6,418,239 B1 * | 7/2002 | Hullender et al. | 382/229 |
| 6,502,114 B1 * | 12/2002 | Forcier | 715/541 |
| 7,036,077 B2 * | 4/2006 | Saund et al. | 715/273 |
| 7,098,896 B2 * | 8/2006 | Kushler et al. | 345/168 |
| 7,155,683 B1 * | 12/2006 | Williams | 715/816 |
| 2003/0182630 A1 * | 9/2003 | Saund et al. | 715/530 |
| 2003/0210272 A1 * | 11/2003 | D'Souza | 345/773 |
| 2004/0046744 A1 * | 3/2004 | Rafii et al. | 345/168 |
| 2004/0046791 A1 * | 3/2004 | Davis et al. | 345/762 |
| 2004/0054701 A1 * | 3/2004 | Garst | 708/131 |

OTHER PUBLICATIONS

D. Venolia et al., "T-Cube: A Fast, Self Disclosing Pen-Based Alphabet," Human Factors in Computing Systems, Apr. 24-28, 1994, pp. 581-584.*
J. Pereira et al., "Towards Calligraphic Interfaces: Sketching 3D Scenes with Gestures and Context Icons," IEE, 2000.*
H. Richy et al., "On-line Correction of Web Pages," IEEE, 1999, pp. 581-584.
D. Venolia et al., "T-Cube: A Fast, Self-Disclosing Pen-Based Alphabet," Human Factors in Computing Systems, Apr. 24-28, 1994, pp. 265-270.
A. van Dam, "Post-WIMP User Interface," Communications of the ACM, vol. 40, No. 2, Feb. 1997, pp. 63-67.
J. Pereira et al., "Towards Calligraphic Interfaces: Sketching 3D Scenes with Gestures and Context Icons," IEE, 2000.
CN Office Action dtd Jul. 28, 2006, CN Appln No. 200410008217.3.

* cited by examiner

*Primary Examiner*—Ryan F Pitaro
(74) *Attorney, Agent, or Firm*—Woodcock Washburn LLP

(57) ABSTRACT

Gesture feedback techniques are discussed that provide prompt feedback to a user concerning the recognition of one or more gestures. The feedback may be employed to confirm to a user that a gesture is being correctly recognized. The feedback may alternately warn a user that a desired gesture is not being correctly recognized, thereby allowing the user to cancel the erroneous gesture before it is invoked

56 Claims, 11 Drawing Sheets

CANCELING SAVE

SAVING FILE

CANCELING SAVE

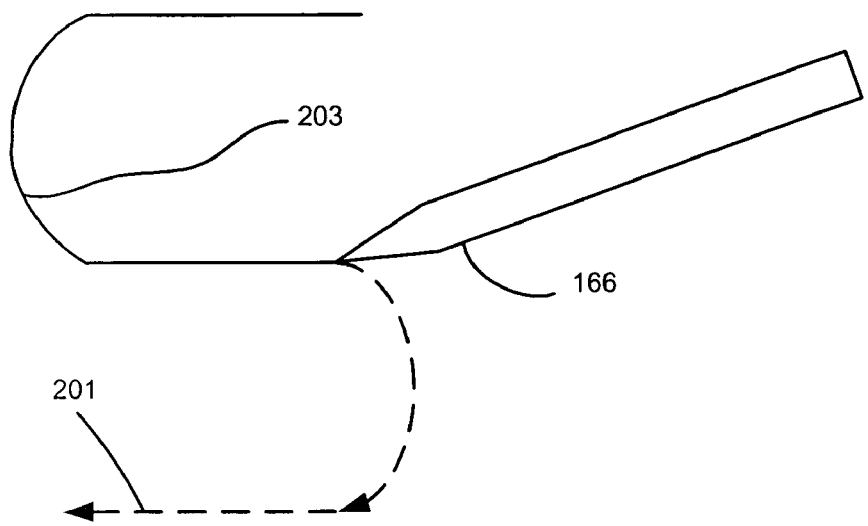
Figure 7
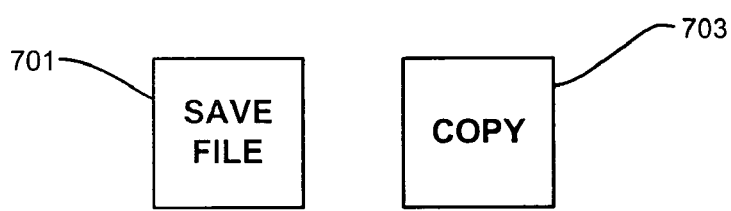
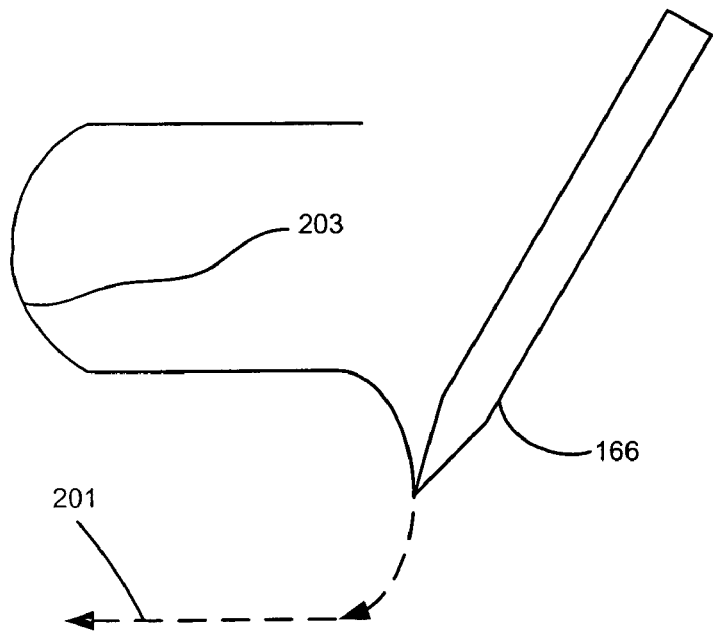
Figure 8
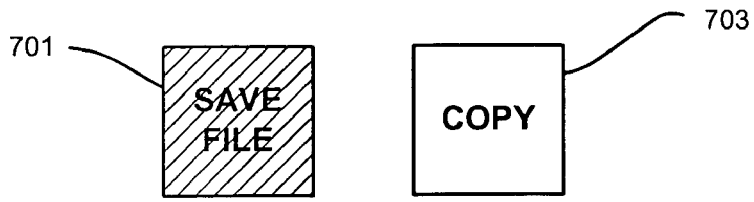

DYNAMIC FEEDBACK FOR GESTURES

FIELD OF THE INVENTION

Various embodiments of the present invention relate to dynamic feedback for gestures. Some embodiments of the invention have particular application to providing feedback to a user making a gesture that confirms recognition of the gesture before the gesture is completed.

BACKGROUND OF THE INVENTION

As the field of computer science has matured, a variety of devices have been developed to allow users to input information into computer devices. One group of these devices is referred to as pointing devices. As the user moves the device or a component of the device, the pointing device generates position data corresponding to the movement of the pointing device. This position data is in turn translated into movement of a pointer image rendered on a display. Thus, by moving the pointing device, a user can associate the pointer image with data represented by other images rendered on the display. A user can then manipulate that data by activating a command action associated with the pointer, such as depressing a command button.

One particular category of pointing device allows a user to input information into a computer by moving a pen or stylus relative to a surface. For example, some computers now include a digitizing tablet that detects the position of a stylus relative to the tablet. As the stylus moves across (or, in some cases, above) the surface of the tablet, the tablet produces position data based upon the position of the stylus. With these computers, the digitizing tablet may be separate from the display, or it may be incorporated into the display. One example of this type of input device is employed by the Microsoft TabletPC.

The stylus pointing device conveniently allows a user to input data using the natural input technique of handwriting. For example, the Microsoft TabletPC can convert position data generated by writing on a tablet surface with the stylus into electronic ink, much like an actual pen writes ink onto paper. In an effort to increase the capability of the stylus pointing device, some computers are even capable of recognizing "gestures" made with a stylus. More particularly, these computers recognize specific movements made with the stylus as commands, such as commands to perform an action or to produce a character. For example, this type of computer may recognize an oversized "S" movement made with the stylus as a command to save an open file, or recognize a "<" or ">" movement made with a stylus as a command to shift the images rendered on the display left or right, respectively. Alternately or additionally, this type of computer may recognize the movement of the stylus in a "v" shape or in an "c" shape as a command to produce the text character "v" or "c", respectively.

While the use of gestures significantly enhances the capabilities of a stylus pointing device, it is sometimes difficult for a user to know when a particular gesture has been properly recognized. Because the movement of the stylus will be different each time a gesture is made by a user, a particular gesture cannot always be accurately recognized. Accordingly, a user must typically make a complete gesture, and then wait to see if the gesture was accurately recognized. If the computer does not recognize a gesture, it will not take the desired action. Even worse, if the computer incorrectly recognizes the movement of the stylus as another gesture, it will subsequently perform an undesired operation which the user must then undo. Alternately, a user may inadvertently move the stylus and make a gesture that was not intended. With conventional computers, a user would not realize that he or she had accidentally made a gesture until the corresponding operation was executed. If the user does not realize that the computer accepts gestures made with a stylus, the user may not even understand why the operation was executed.

SUMMARY OF THE INVENTION

Advantageously, various embodiments of the invention may be employed to provide prompt feedback to a user that indicates when a gesture has been recognized. More particularly, various embodiments of the invention provide feedback to a user that indicates when a gesture has been recognized even before the user has finished making the gesture. If the user's gesture has been correctly recognized, this prompt feedback reassures the user that the corresponding gesture command will be accurately invoked. Alternately, if the user's gesture has not been correctly recognized, the user may quickly restart the gesture. Further, if the user's gesture has been incorrectly recognized as another gesture, the user can continue to move the stylus so as to cancel the incorrectly recognized gesture.

With various embodiments of the invention, a gesture recognition module receives position data from a pointing device being manipulated by user. The gesture recognition module continuously analyzes the received position data, in order to recognize if the pointing data corresponds to a gesture. When the gesture recognition module recognizes that the received position data corresponds to a gesture, a gesture feedback module provides feedback to the user indicating that a gesture has been recognized from the position data. As the user continues to manipulate the pointing device, the gesture recognition module continues to analyze the position data received from the pointing device. If the position data continues to correspond to a recognized gesture, then the gesture will be invoked when the user stops manipulating the pointing device. If, however, the position data does not continue to correspond to a recognized gesture, then the gesture feedback module provides new feedback to the user indicating that a gesture is no longer being recognized from the position data. This new feedback may expressly indicate that a gesture is no longer being recognized, or it may simply be a deletion of the earlier feedback.

BRIEF DESCRIPTION OF THE DRAWINGS

FIGS. 5-12 show different examples of prompt, dynamic feedback according to various embodiments of the invention.

DETAILED DESCRIPTION OF PREFERRED EMBODIMENTS

Overview

The present invention relates to a gesture feedback tool that recognizes commands from gestures made by a user. Moreover, when the gesture feedback tool recognizes that a gesture corresponds to a command, it provides the user with feedback indicating the command that the tool has recognized from the gesture. As will be discussed in detail below, the tool provides the feedback after the gesture is recognized, but before the user completes the gesture. For example, if the tool recognizes the user's gesture as a command to perform an action, then the tool may provide the user with feedback in the form of an icon representing that action. Alternately or additionally, if the tool recognizes the user's gesture as a command to generate a text character, then the tool may provide the user with feedback in the form of, for example, the recognized text character superimposed over the space where the user is making the gesture.

As previously noted, the tool may provide the feedback before the user has completed the gesture. This prompt feedback allows the user to confirm that the gesture has been correctly recognized before the corresponding command is invoked. Further, if the user's gesture is almost complete but has not been correctly recognized, then the user may quickly restart the gesture without fruitlessly waiting for the command to be invoked. Further, if the user's gesture has been incorrectly recognized as another gesture, the user can continue to move the pointing device so as to cancel the incorrectly recognized gesture.

A gesture feedback tool according to the invention may be implemented using a variety of techniques. For example, some embodiments of the invention may be implemented using circuitry formed with solid state electronics. Still other embodiments of the invention may be implemented using instructions executed on a programmable computing device. Accordingly, an exemplary computing environment for executing such instructions will be described. Various interfaces demonstrating the operation and use of the invention will also be described, along with the components and functions of a gesture feedback tool according to various embodiments the invention.

Exemplary Operating Environment

As previously noted, the gesture feedback tool of the invention may be implemented using instructions that can be executed on a programmable computer, sometimes referred to as software. That is, the gesture feedback tool may be described in the general context of computer-executable instructions, such as program modules, executed by one or more computing devices. Generally, program modules include routines, programs, objects, components, data structures, etc. that perform particular tasks or implement particular abstract data types. Typically the functionality of the program modules may be combined or distributed as desired in various embodiments.

Figure 1:
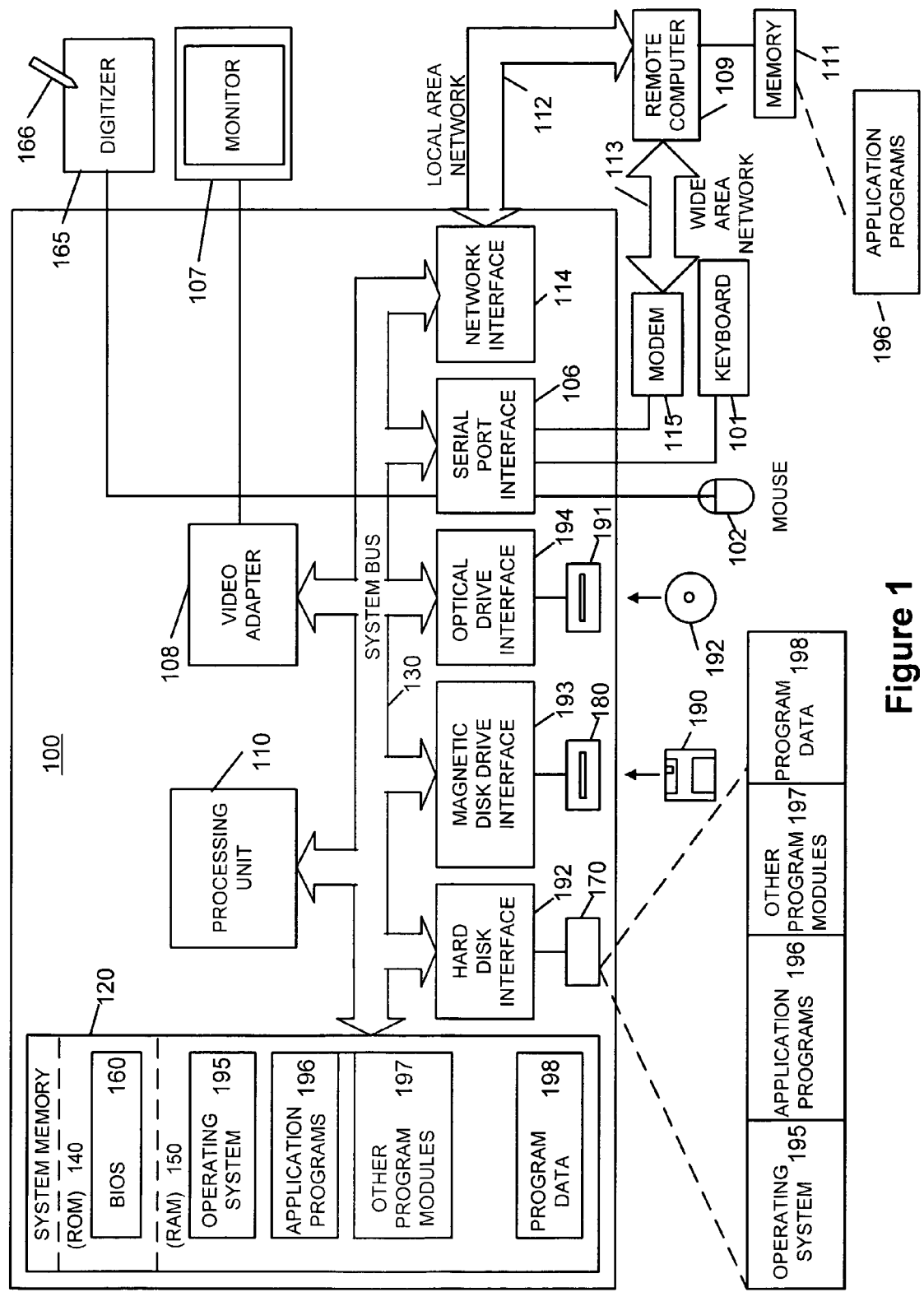
FIG. 1 shows a schematic diagram of a general-purpose digital computing environment that can be used to implement various aspects of the invention.

Because the invention may be implemented using software, it may be helpful for a better understanding of the invention to briefly discuss the components and operation of a typical programmable computer on which various embodiments of the invention may be employed. Such an exemplary computer system is illustrated in FIG. 1. The system includes a general-purpose computer 100. This computer 100 may take the form of a conventional personal digital assistant, a tablet, desktop or laptop personal computer, network server or the like.

Computer 100 typically includes at least some form of computer readable media. Computer readable media can be any available media that can be accessed by the computer 100. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computer 100.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The computer 100 typically includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150. A basic input/output system 160 (BIOS), containing the basic routines that help to transfer information between elements within the computer 100, such as during start-up, is stored in the ROM 140.

The computer 100 may further include additional computer storage media devices, such as a hard disk drive 170 for reading from and writing to a hard disk, a magnetic disk drive 180 for reading from or writing to a removable magnetic disk 190, and an optical disk drive 191 for reading from or writing to a removable optical disk 192, such as a CD ROM or other optical media. The hard disk drive 170, magnetic disk drive 180, and optical disk drive 191 are connected to the system bus 130 by a hard disk drive interface 172, a magnetic disk drive interface 193, and an optical disk drive interface 194, respectively. The drives and their associated computer-readable media provide nonvolatile storage of computer readable instructions, data structures, program modules, and other data for the personal computer 100. It will be appreciated by those skilled in the art that other types of computer readable media that may store data that is accessible by a computer, such as magnetic cassettes, flash memory cards, digital video disks, Bernoulli cartridges, random access memories (RAMs), read only memories (ROMs), and the like, may also be used in the example operating environment. Also, it should be appreciated that more portable embodiments of the computer 100, such as a tablet personal computer or personal digital assistant, may omit one or more of the computer storage media devices discussed above.

A number of program modules may be stored on the hard disk drive 170, magnetic disk 190, optical disk 192, ROM 140, or RAM 150, including an operating system 195, one or more application programs 196, other program modules 197, and program data 198. A user may enter commands and information into the computer 100 through various input devices, such as a keyboard 101 and a pointing device 102 (for example, a mouse, touchpad, or pointing stick). As previously noted, the invention is directed to a tool for providing feedback when a gesture is recognized. As will be appreciated by those of ordinary skill in the art, while the gesture input can be generated using a variety of pointing devices, the most convenient pointing device for creating this type of input is often a pen or stylus. Accordingly, the computing device 120 will typically include a digitizer 165 (sometimes referred to as a graphics pad) and a stylus or pen 166, which a user may employ to create handwriting input that can be recognized as a gesture. As will be appreciated by those of ordinary skill in the art, with some embodiments, the digitizer 165 receives handwriting input when the stylus or pen 166 contacts the surface of the digitizer 165. With other embodiments, the digitizer 165 may receive handwriting input from a light beam generated by the pen 166, by tracking the angular movement of a mechanical arm supporting the pen 166, or by another suitable technique.

These and other input devices often are connected to the processing unit 110 through a serial port interface 106 that is coupled to the system bus 130, but may be connected by other interfaces, such as a parallel port, game port, IEEE-1394B bus, or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor 107, personal computers typically include other peripheral output devices (not shown), such as speakers and printers. As will be appreciated by those of ordinary skill in the art, the monitor 107 may incorporate the digitizer 165, to form a digitizing display 165. This arrangement conveniently allows a user to employ the pen 166 to point directly to objects displayed on the digitizing display by contacting the display screen of the display 165.

The computer 100 may operate in a networked environment using logical connections to one or more remote computers, such as a remote computer 109. The remote computer 109 may be a server, a router, a network PC, a peer device, or other common network node, and typically includes many or all of the elements described above relative to the computer 100, although only a memory storage device 111 with related applications programs 196 have been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet, and thus will not be explained in detail here.

When used in a LAN networking environment, the computer 100 is connected to the local network 112 through a network interface or adapter 114. When used in a WAN networking environment, the personal computer 100 typically includes a modem 115 or other means for establishing a communications link over the wide area network 113, e.g., to the Internet. The modem 115, which may be internal or external, may be connected to the system bus 130 via the serial port interface 106. In a networked environment, program modules depicted relative to the personal computer 100, or portions thereof, may be stored in a remote memory storage device. Of course, it will be appreciated that the network connections shown are exemplary and other techniques for establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Gesture Recognition without Prompt Feedback

Figure 2A:
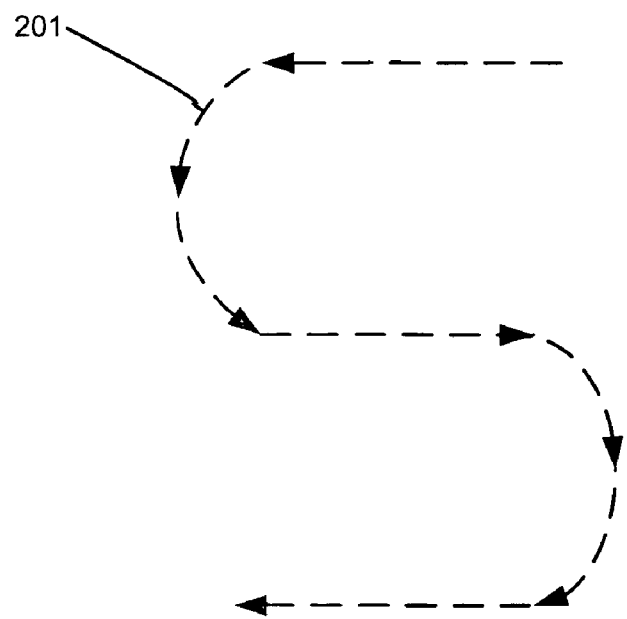
FIGS. 2A-2D show an example of gesture recognition without prompt feedback.
Figure 2B:
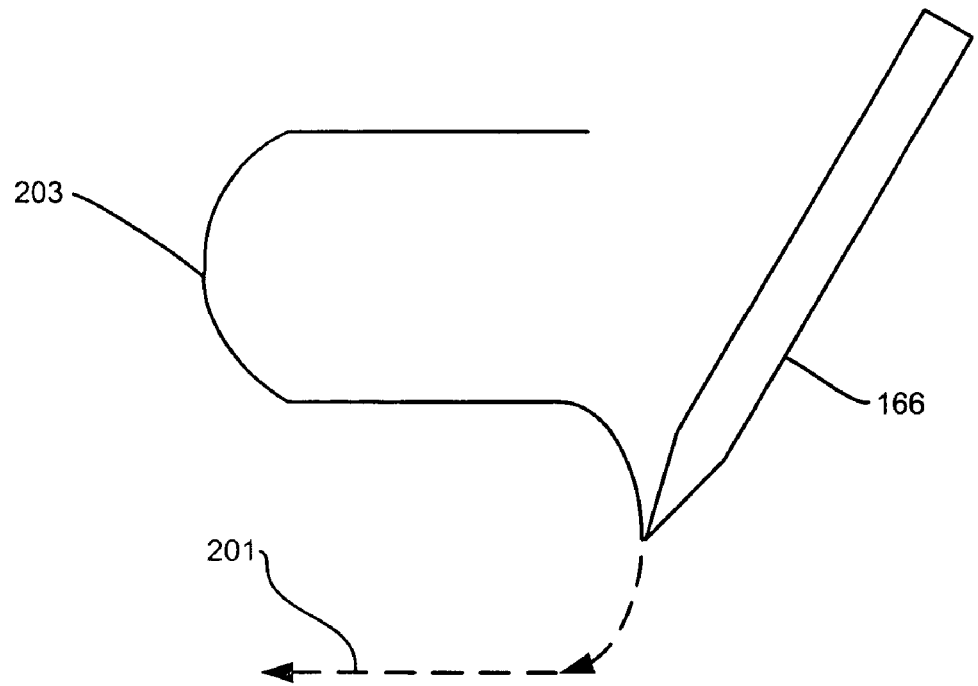

In order to better distinguish the prompt and dynamic feedback features of the invention, an example of a gesture recognition process that does not employ the dynamic feedback of the invention will first be discussed. Referring now to FIG. 2A, shape 201 is a pattern that a gesture recognition module will recognize as a gesture corresponding to a command. In particular, shape 201 is an "S" shape that will be recognized as, for example, a command to save an open file or to generate the text character "S". It should be appreciated that the shape 201 is typically not displayed to a user, and thus is illustrated with a dotted line in FIG. 2A. In order to make the gesture represented by the shape 201, the user employs a stylus 166 to produce the handwriting input 203, as shown in FIG. 2B. In this figure, the handwriting input 203 is illustrated as a solid line. It should be noted, however, that some gesture recognition modules may not display the handwriting input 203 generated with the stylus 166.

As also seen in this figure, while the user has generated handwriting input 203 corresponding to most of the gesture shape 201, the gesture recognition module still does not provide feedback to the user indicating whether or not the handwriting input 203 has been recognized as the gesture corresponding to the shape 201. At the position illustrated in FIG. 2B, the gesture recognition module may have recognized the handwriting input 203 as the gesture represented by the shape 201. Even if the gesture recognition module has made this recognition, however, the user is unaware of this recognition.

Figure 2C:
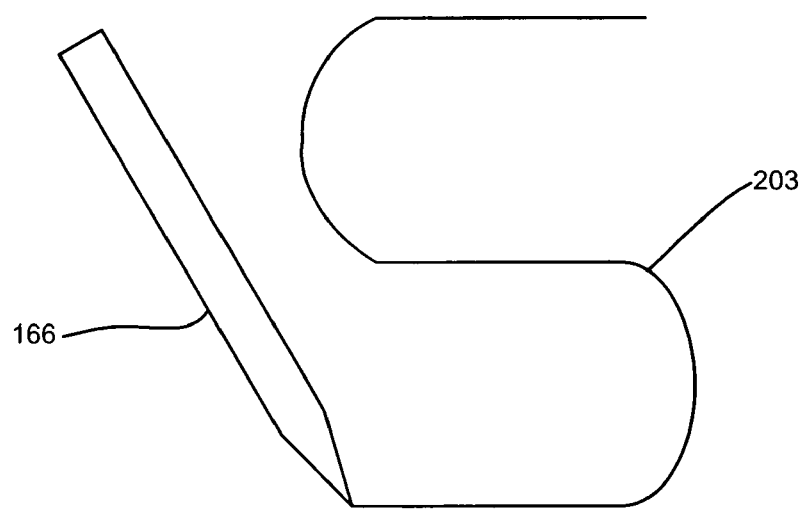
Figure 2D:
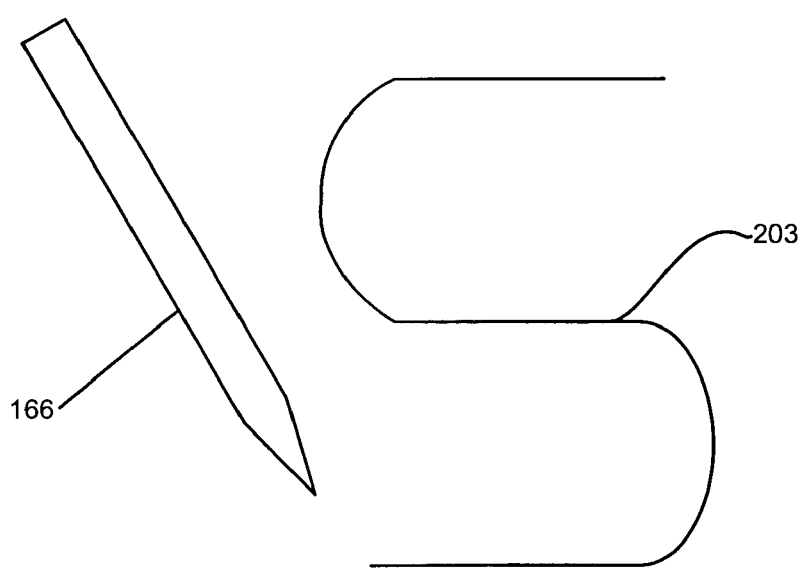

Referring now to FIG. 2C, even if the user completes the handwriting input 203 corresponding to the gesture shape 201, the gesture recognition module still does not provide any feedback to the user to indicate whether the appropriate gesture has been recognized. With some gesture recognition modules, after the user stops making a gesture (that is, when the user has completed the handwriting input 203 and removed the stylus 166 from the surface of the digitizer 165), the gesture recognition module may still not provide any feedback to the user indicating whether or not the gesture has been correctly recognized, as illustrated in FIG. 2D. Thus, the user must wait to see whether or not the command corresponding to the desired gesture is invoked to determine if the user's gesture has been correctly recognized.

The Gesture Feedback Tool

Figure 3:
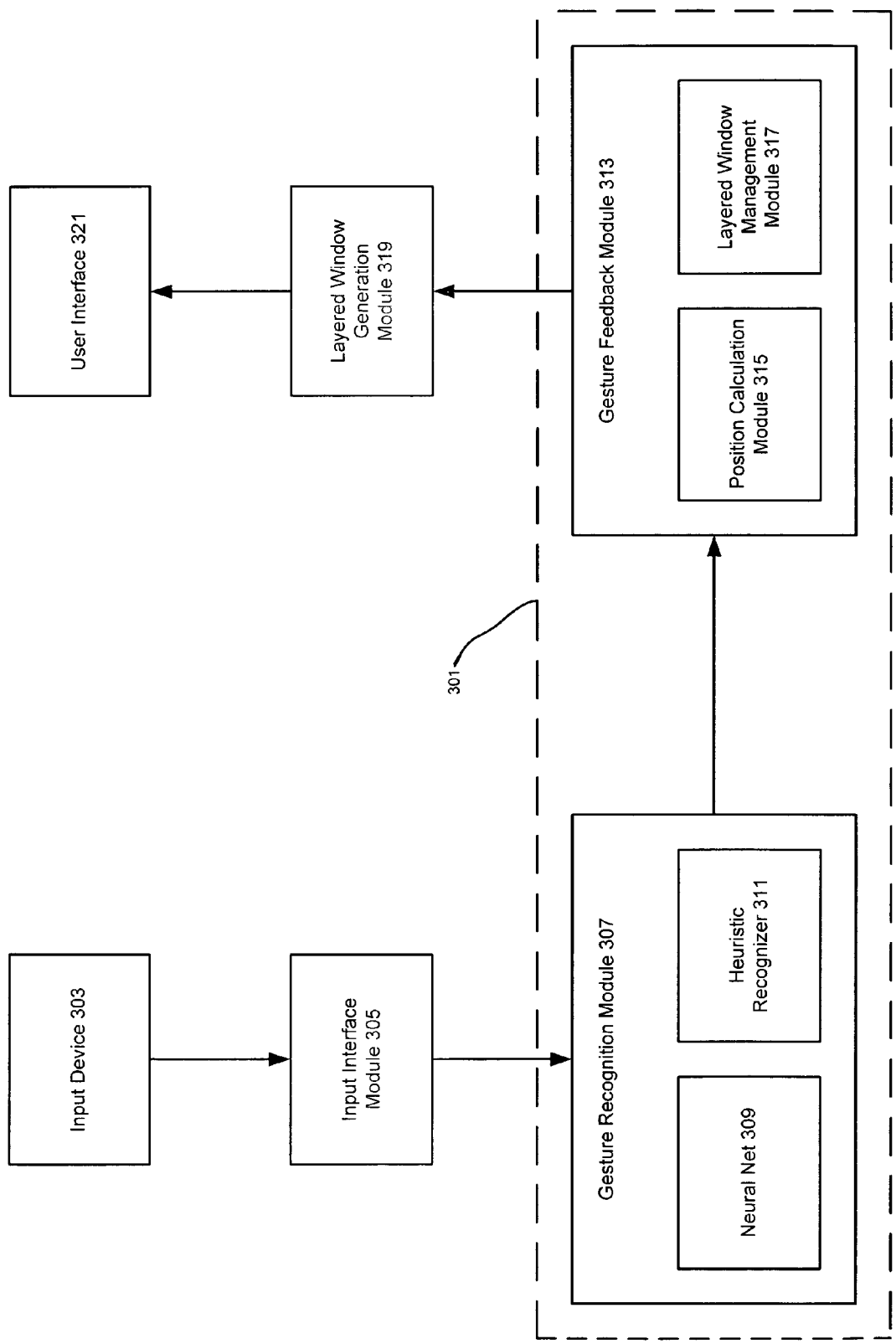
FIG. 3 illustrates a gesture feedback tool according to an embodiment of the invention.

FIG. 3 illustrates a gesture feedback tool 301 according to one embodiment of the invention. As will be discussed in detail below, the gesture feedback tool 301 both recognizes a gesture made by a user and provides prompt feedback to the user confirming recognition of the gesture. As seen in this figure, the tool 301 is employed in a system including a user input device 303 and an input interface module 305. The system also includes a layered window generation module 319 and the user interface 321. Each of these system components will be discussed in further detail below.

Referring first to the user input device 303, the user input device 303 may be any device through which a user can generate position data corresponding to the position of the pointing device. For example, the input device 303 may be any type of conventional pointing device, including a mouse, touch pad, joystick, or trackball. As will be appreciated by those of ordinary skill in the art, these types of pointing devices generate virtual position data based upon the location of displayed pointer icons controlled by movement of (or movement over) the pointing device.

In the illustrated embodiment, however, the input device 303 is a stylus 166, which can conveniently be employed by a user to generate absolute position data in the form of handwriting input data. That is, the stylus 166 generates absolute position data based upon the position of the stylus 166 relative to the surface of a digitizer 165. It should be noted that the position data generated by the stylus 166 and digitizer 165 may be more than just simple coordinate values on an x-y plane. As will be appreciated by those of ordinary skill in the art, some types of digitizers may be able to determine the distance between the stylus 166 and the surface of digitizer 165, the angle at which the stylus 166 is held relative to the surface of the digitizer 165, and may even be able to determine the amount of pressure applied by the stylus 166 against the surface of the digitizer 165. One or more of these characteristics (or any other position characteristic that can be determined for any type of pointing device) may be used to produce position data for making a gesture according to various embodiments of the invention.

The input interface module 305 may then be any type of user interface module for providing data to the tool 301 based upon the position data created with the input device 303. Thus, if the input device 303 is a stylus 166, then the input interface module 305 may be an application programming interface (API) for converting the position data created by moving the stylus 166 over the surface of the digitizer 165 into data that can be employed by the tool 301. For example, the input interface module 305 may convert the absolute position data created with the stylus 166 into electronic ink data made up of discrete samples of the position data with corresponding of vector information for each sample. Of course, the input interface module 305 may convert the position data into any data format useful to the tool 301. Various types of input interface modules 305 using position data created by pointing devices are well-known in the art, and thus will not be discussed in more detail here.

Referring back now to FIG. 3, the tool 301 includes a gesture recognition module 307. The gesture recognition module 307 may employ a neural net 309 and/or a heuristic recognizer 311 for recognizing when position data created using the input device 303 corresponds to a gesture. It should be noted that, while the illustrated embodiment includes both a neural net 309 and a heuristic recognizer 311 for recognizing gestures, additional or alternate techniques may be employed to recognize gestures from position data created with the input device 303. The use of these alternate techniques, as well as the use of the neural net 309 and the heuristic recognizer 311, are well known in the art, and thus will not be discussed in further detail.

The tool 301 also includes a gesture feedback module 313. As seen in FIG. 3, the gesture feedback module 313 includes a position calculation module 315 and a layered window management module 317. When the gesture recognition module 405 recognizes that position data generated with the input device 303 corresponds to a gesture, the gesture recognition module 405 reports the recognized gesture to the gesture feedback module 313. In response, the position calculation module 315 determines what type of gesture feedback should be displayed to the user in order to inform the user that the gesture has been recognized. With some embodiments of the invention, for example, the position calculation module 315 may employ a look-up table to determine a gesture feedback corresponding to the recognized gesture provided by the gesture recognition module 307. Of course, still other embodiments of the invention may employ any desirable technique for determining the form of the gesture feedback that will be displayed to the user in response to recognition of a particular gesture. Also, as will be discussed in detail below, the gesture feedback may take a variety of different forms, including the display of one or more icons, text messages, colors changes, and animation, the playback of an audible sound, or a combination of two or more of these forms.

The position calculation module 315 also determines a position at which the feedback corresponding to the recognized gesture will be displayed to the user. For example, with some embodiments of the invention, the position calculation module 315 may determine that the gesture feedback (that is, the feedback indicating that the gesture has been recognized) will be displayed at a fixed distance below the lowest position data making up the gesture, or at a fixed distance above the highest position data making up the gesture. Alternately, the position calculation module 315 may determine a bounding area in which the entire gesture should be contained. The position calculation module 315 may then determine that the gesture feedback will be displayed at a fixed distance above, below or to either side of this bounding area. Still further, the position calculation module 315 may track the changes in position data as the user employs the input device 303 to make the gesture. The position calculation module 315 may then continuously determine a new position for the gesture feedback corresponding to the new position data created with the input device 303.

With some embodiments of the invention, the position calculation module 315 may even determine the type or form of gesture feedback that will be displayed to the user based upon the location of the position data making up the gesture. For example, if the position data making up the gesture is contained within a relatively small display area, then the position calculation module 315 may determine that a small icon should be displayed as the gesture feedback rather than a longer text message. It should be appreciated, however, that with alternate embodiments of the invention, determining the form of the gesture feedback and determining the position at which the gesture feedback will be displayed to the user may be performed by different components, rather than by the single position calculation module 315.

With the embodiment of the invention illustrated in FIG. 3, the gesture feedback is displayed using multiple transparent layered windows. As known to those of ordinary skill in the art, this type of transparent layered window is a graphical user interface in which only the content contained within the window is displayed. Thus, this type of transparent layered window will not typically include visible borders, toolbars, task bars, edit controls or other types of controls, thereby minimizing the processing overhead required to display the content. Moreover, with the illustrated embodiment, a single gesture feedback may be rendered using multiple small transparent layered windows, further minimizing the processing overhead of the system.

Accordingly, once the position calculation module 315 has determined the form of the gesture feedback and the position at which the gesture feedback will be displayed to the user, the layered window management module 317 instructs the layered window generation module 319 to generate that gesture feedback at the determined position on the user interface 321. The layered window generation module 319 may be, for example, a conventional application programming interface (API) for managing the appearance and content of windowed graphical user interfaces. Similarly, the user interface 321 may be any type of conventional display, including, for example, a cathode ray tube (half) display, a plasma screen display, or a liquid crystal (LCD) display, each of which are well known in the art. The layered window management module 317 can then be any type of module for controlling the operation of the layered window of generation module 319 to display the desired gesture feedback.

Operation of the Gesture Feedback Tool

Figure 4:
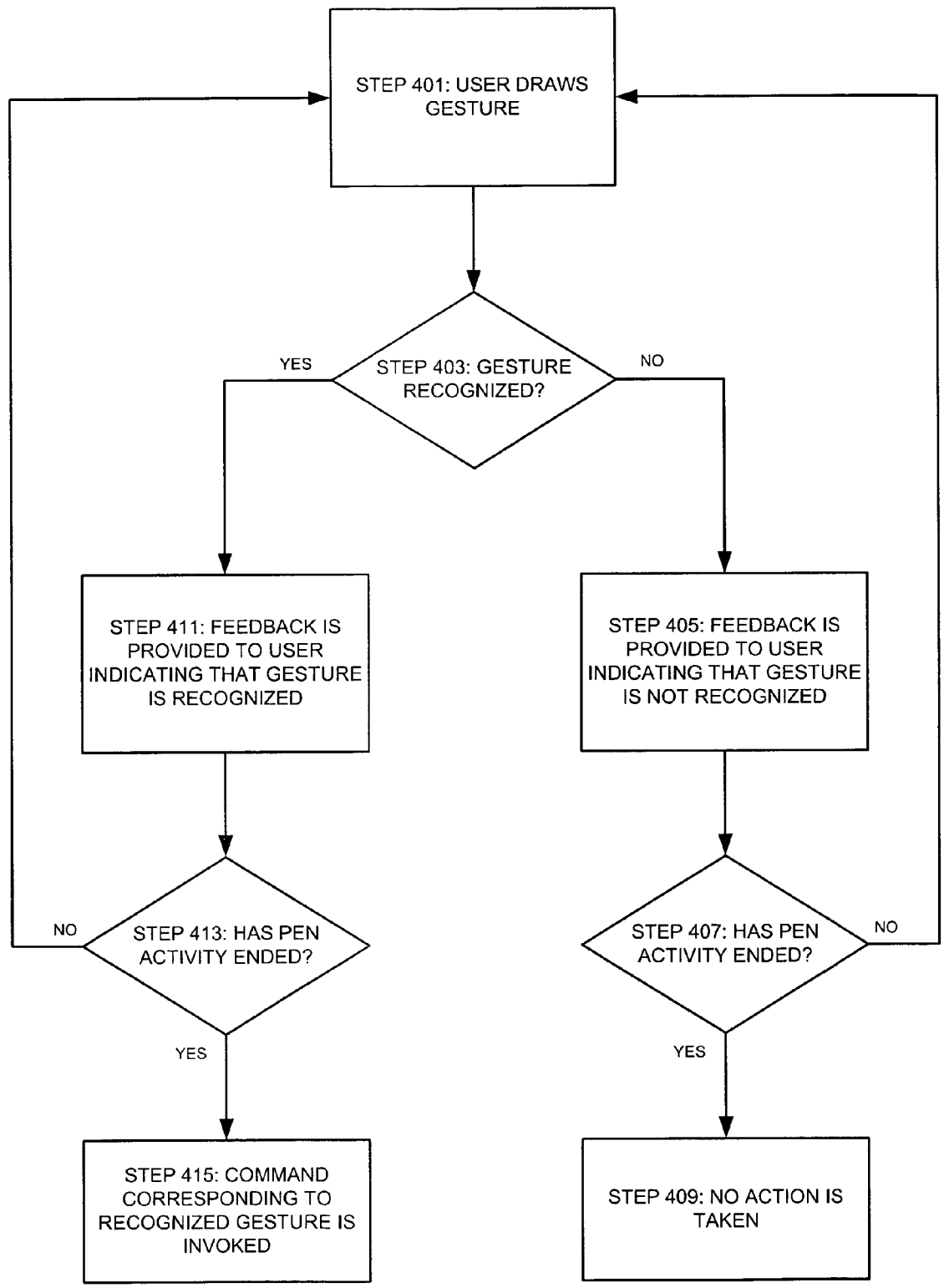
FIG. 4 illustrates a method of providing dynamic gesture feedback according to an embodiment of the invention.

FIG. 4 illustrates a method of providing dynamic feedback confirming recognition of a gesture that may be used for a variety of embodiments of the invention, including the gesture feedback tool 301. As seen in this figure, the process of providing the gesture feedback to the user starts when the user begins to draw a gesture in step 401. In step 403, the gesture recognition module determines if the gesture drawn thus far by the user is recognized. For example, with the gesture feedback tool 301, the gesture recognition module 307 determines if the position data from the input device 303 corresponds to a gesture.

If the gesture is not yet recognized, then, in step 405, feedback is provided to the user indicating that the gesture has not yet been recognized. With some embodiments of the invention, this non-recognition feedback may be active feedback positively indicating to the user that a gesture has not yet been recognized. For example, the gesture feedback module 313 may instruct the layered window generation module 319 to generate a window with text message content stating that a gesture has not yet been recognized. With still other embodiments of the invention, however, the non-recognition feedback may be passive feedback, where no action is taken (that is, where the user interface 321 remains unchanged) when a gesture has not been recognized by the gesture recognition module. While positive non-recognition feedback actively informs the user that the gesture has not yet been recognized, passive non-recognition feedback requires little or no processing overhead by the gesture feedback module.

In step 407, the gesture recognition module determines if the user has stopped making the gesture. For example, with the embodiment of the invention illustrated in FIG. 3, the gesture recognition module 307 determines if the input device 303 is continuing to produce position data. If the input device 303 is no longer producing position data (that is, if the user has lifted the stylus 166 from the surface of the digitizer 165), then in step 409 no further action is taken by the tool 301. If, however, the user is continuing to draw the gesture, then the process loops around to step 401, where the gesture recognition module continues to attempt to recognize the gesture in step 403.

When the gesture recognition module recognizes the user's gesture in step 403, the gesture feedback module provides feedback to the user indicating that the gesture has been recognized in step 411. For example, with the embodiment illustrated in FIG. 3, when the gesture recognition module 307 has recognized a gesture from the position data provided by the input device 303, the gesture feedback module 313 provides feedback to the user interface 321 indicating that the gesture has been recognized.

With some embodiments of the invention, the recognition feedback may simply indicate to the user that a gesture has been recognized from the position data, without specifically identifying which gesture was recognized by the gesture recognition module. Thus, the recognition feedback may be an icon that the user will recognize as confirmation that a gesture has been recognized, a text message simply stating that a gesture has been recognized, or other visible display that will indicate to a user that a gesture has been recognized. Alternately or additionally, an audible indicator may be played to inform the user that a gesture has been recognized from the position data. For example, some embodiments of the invention may play a specific tone when the gesture is recognized, or playback a voice message stating that a gesture has been recognized from the position data.

With still other embodiments of the invention, however, the recognition feedback will specifically identify the gesture recognized from the position data. For example, if the gesture is recognized as corresponding to a command to take some action, then the gesture feedback module (for example, the gesture feedback module 313 for the embodiment of the invention illustrated in FIG. 3) may display an icon, text message, or other image that the user will associate with that action. Thus, if the gesture recognition module 307 recognizes that input position data corresponds to a gesture for saving an open file, then the gesture feedback module 313 may display an icon informing the user that an open file has been saved. Alternately, the gesture feedback module 313 may display a text message reading, for example, "file saved." If, on the other hand, the gesture is recognized as corresponding to a command to provide one or more text characters, then the gesture feedback module may display those characters. For example, if the gesture is recognized as a command to generate the letter "A", then the gesture feedback module may display the letter "A" to inform the user that the gesture was recognized.

It should also be appreciated that the speed at which the feedback provided by the gesture feedback module may be dependent upon the speed at which the gesture recognition module 307 recognizes a gesture from the position data. If the operation of the gesture recognition module 307 is too slow to process each new piece of position data created by the input device 303, then the gesture recognition module 307 may only periodically sample the position data generated by the input device 303 to recognize a gesture. Other techniques may alternately or additionally be employed to speed up the operation of the gesture recognition module 307, such as, for example, performing the gesture recognition process using a dedicated programming thread. In any case, if the gesture recognition module 307 recognizes a gesture more slowly than position data is created to make that gesture, then the feedback provided by the gesture feedback module 313 may also lag behind the creation of the position data. Accordingly, some embodiments of the invention may change the feedback by, for example, changing the color or luminosity of displayed feedback, to indicate the delay at which a gesture is being recognized.

For some embodiments of the invention, the gesture recognition module (for example, the gesture recognition module 307 of the embodiment illustrated in FIG. 3) may provide a confidence level in the recognition of a gesture. For example, when a user has only partially completed a gesture, the gesture recognition module may correctly recognize the gesture, but have a relatively low confidence level in the accuracy of its recognition. As the user continues to complete the gesture (and the recognition system receives additional position data from the input device 303), the confidence level for the accuracy of the recognized gesture may increase. Accordingly, gesture feedback may be provided by various embodiments of the invention that further informs the user as to the confidence level in the recognition of the gesture.

For example, if the gesture recognition module has a relatively low confidence in the accuracy of a recognized gesture, then the gesture feedback module may provide an icon both identifying the recognized gesture and having a red color to indicate that the confidence in the recognition of this gesture is relatively low. If the gesture recognition module then increases its confidence level in the recognition of the gesture, the gesture feedback module may change the color of the icon from red to yellow, to indicate to the user that the confidence in the recognition of the gesture had increased. If the confidence in the gesture continues to increase, the gesture feedback module may then change the color of the icon again, for example, from yellow to green, to indicate to the user that the confidence in the recognition of the gesture had increased further.

It should be appreciated that, in addition to color, still other techniques can be used to identify the confidence level in the recognition of a gesture. For example, some embodiments of the invention may employ differently-sized icons or other images to inform the user as to the confidence level in the recognized gesture. Still other embodiments of the invention may alternately or additionally use text messages to inform the user as to the confidence level in a recognized gesture. Further, various embodiments of the invention may employ different icons or other images, audible sounds or spoken messages, or still other techniques, including a combination of one or more of the above-mentioned techniques, to inform the user as to the confidence level in a recognized gesture.

With some embodiments of the invention, the gesture recognition module may recognize more than one gesture from a set of position data. For these embodiments, the gesture feedback module may provide gesture feedback identifying each recognized gesture. For example, a gesture recognition module may recognize a gesture made in a "C" shape (as, for example, a gesture corresponding to a command to copy selected data onto a computer's clipboard) and recognize a different gesture made in a "S" shape (as, for example, a gesture corresponding to a command to save an open file). When a user begins to make the gesture corresponding to the "S" shape, the gesture recognition module may initially be unable to differentiate this gesture from the gesture corresponding to the "C" shape. Instead, the recognition system may "recognize" the gesture as corresponding to both the "S" shape and the "C" shape. In this situation, various embodiments of the invention may provide gesture feedback identifying both gestures.

Still further, some of these embodiments of the invention may provide gesture feedback that identifies both each recognized gesture and a confidence level associated with each of the recognized gestures. Thus, in the above example, if the gesture recognition module initially assigns the same confidence level to both the gesture corresponding to the "S" shape and the gesture corresponding to the "C" shape, the gesture feedback module may provide the user with icons identifying both gestures and having the same color. As the user continued to complete the "S"-shaped gesture, the gesture recognition module would increase the confidence level in the recognition of the "S"-shaped gesture relative to the confidence level in the recognition of the "C"-shaped gesture. In response, the gesture feedback module may change the color of the icon identifying the "S"-shaped gesture, to inform the user that the confidence level in the recognition of the "S"-shaped gesture has increased.

With still other embodiments of the invention, the gesture feedback module may provide gesture feedback that allows a user to select the execution of one recognized gesture over another recognized gesture. Thus, with the above example, the gesture feedback module may initially display icons identifying both the "C"-shaped gesture and the "S"-shaped gesture. The user can then select the desired gesture by, for example, directing the pointer for the pointing device over the icon identifying the desired gesture and then activating a command button (or making an equivalent action), commonly referred to as "clicking" on the icon. It should be appreciated, however, that a variety of techniques can be employed to both identify two or more recognized gestures and to allow a user to select a recognized gesture for invoking a desired command.

Returning now to FIG. 4, in step 413 the gesture recognition module 307 determines if the user is continuing to create the gesture (that is, if the user is continuing to generate position data). If the user has stopped creating the gesture (for example, if the user has lifted the stylus 166 from the surface of the digitizer 165) then, in step 415, the command represented by the recognized gesture (or the recognized gesture having the highest confidence level) is invoked. If, however, the user is continuing to complete the gesture, then the process loops back to step 401, and the gesture recognition module 307 determines if the gesture continues to be recognized in step 403.

As will be appreciated from this process, a gesture may begin to be recognized before the user has completed the gesture. Moreover, feedback identifying the gesture may be provided to the user before the gesture is complete. Conveniently, if a gesture is being incorrectly recognized as another, undesired gesture, this prompt feedback allows the user to cancel the gesture being incorrectly recognized before the command corresponding to the gesture is invoked. For example, if the user is making a "C"-shaped gesture that is being incorrectly recognized as another gesture, the user may be informed that the gesture is not being correctly recognized by gesture feedback identifying the undesired gesture. When the user realizes that the desired gesture is not being correctly recognized, the user may move the pointing device so as to cancel the recognition of the undesired gesture. Thus, in response to the gesture feedback identifying the undesired gesture, the user may then move the pointing device away from the gesture in a direction that will prevent the gesture recognition module from continuing to recognize the undesired gesture.

Dynamic Gesture Feedback

Figure 5:
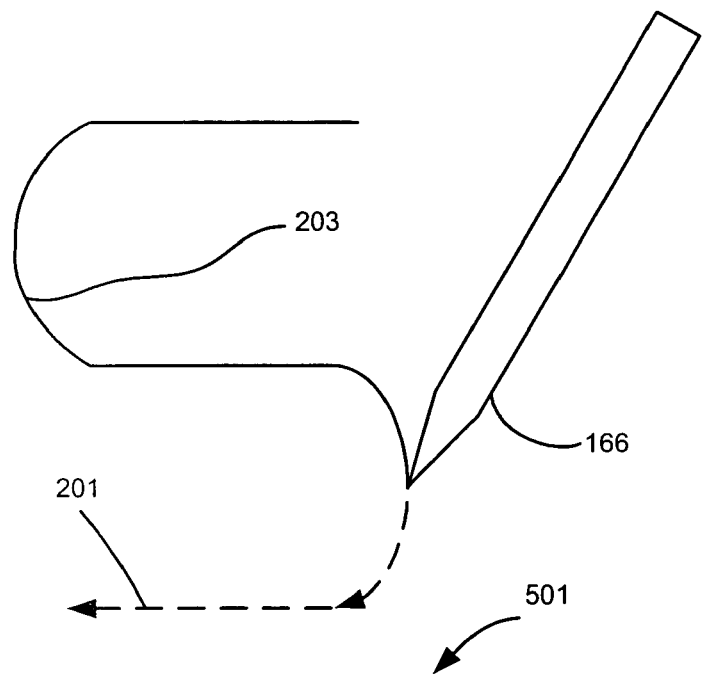
Figure 6:
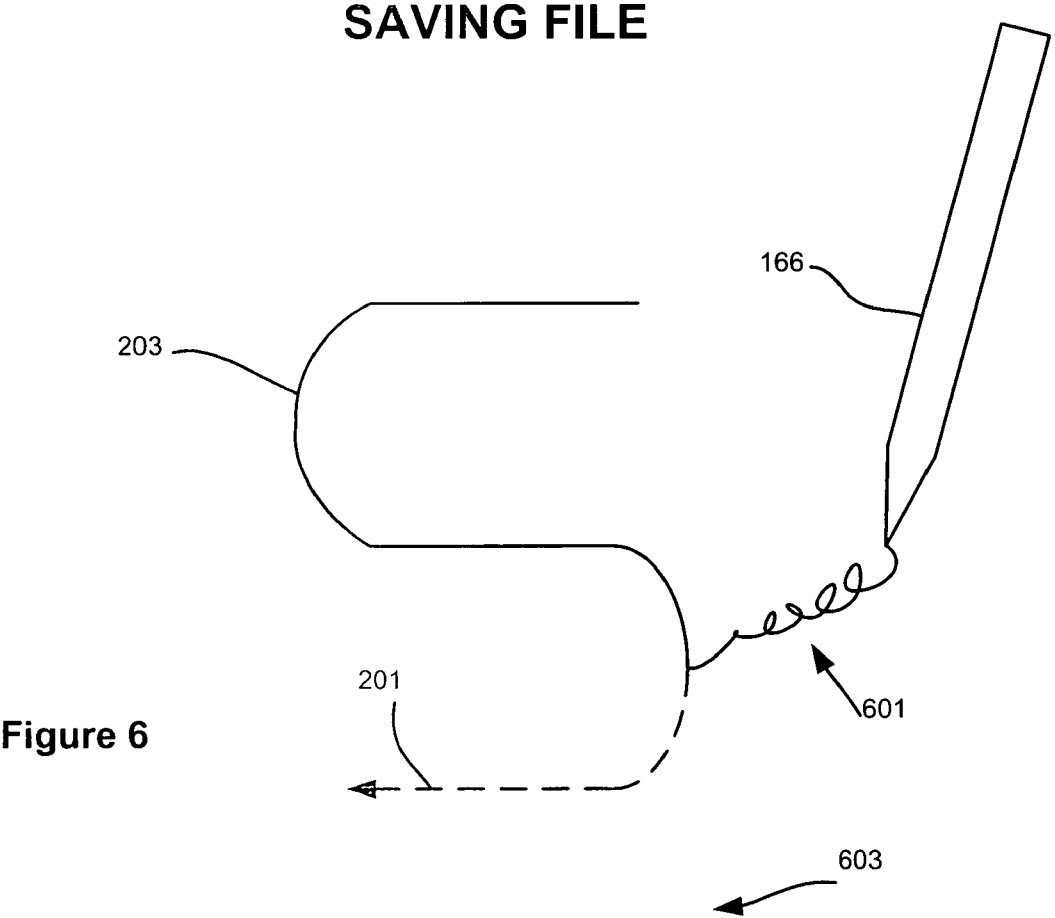

FIG. 5 illustrates one example of gesture feedback that can be provided by various embodiments of the invention, including the embodiment of the invention shown in FIG. 3. As seen in FIG. 5, a user has employed the stylus 166 to draw handwriting input 203 corresponding to a desired gesture shape 201. In this illustrated embodiment, the "S"-shape 201 corresponds to a gesture for saving an open file, which has been recognized by the gesture recognition module 307. Accordingly, the gesture feedback module 313 displays a text message 501 that reads "SAVING FILE", to inform the user that the gesture for saving an open file has been recognized from the handwriting input 203. If this gesture is not the gesture desired by the user, then the user can cancel the gesture by creating the additional handwriting input 601 that does not correspond to the shape 201, as shown in FIG. 6. In response, the gesture recognition module 307 no longer recognizes the handwriting input 203 and 601 as corresponding to the gesture for saving an open file. The gesture feedback module 313 may then provide passive feedback indicating that the gesture is no longer being recognized by deleting the text message 501. Alternately, the gesture feedback module 313 may provide positive feedback confirming that the gesture is no longer being recognized by displaying the text message 603, which reads "CANCELING SAVE".

FIG. 7 illustrates an example of gesture feedback that may be provided when the gesture recognition module 307 recognizes the handwriting input 203 as corresponding to two different gestures: an "S"-shaped gesture representing a command to save a file, and a "C"-shaped gesture representing a command to copy material to a system clipboard. As shown in the figure, the gesture feedback module 313 displays an icon 701 indicating that the handwriting input 203 is being recognized as a gesture representing a command to save a file. The gesture feedback module 313 further displays an icon 703 indicating that the handwriting input is also being recognized as a gesture representing a command to save data to a clipboard. As the user continues to create handwriting input 203 in the "S"-shape 201, the gesture recognition module 307 may increase the confidence level in the recognition of the handwriting input 203 as a gesture representing a command to save a file relative to its confidence level in the recognition of the handwriting input 203 as a gesture representing a command to copy data to a clipboard. Accordingly, the gesture feedback module 313 may distinguish the icon 701 from the icon 703, to inform the user of the increased confidence level in the recognition of the handwriting input 203 as a gesture representing a command to save a file. For example, as shown in FIG. 8, the gesture feedback module 313 may change the shade, color, or other appearance feature of the icon 701.

Figure 9:
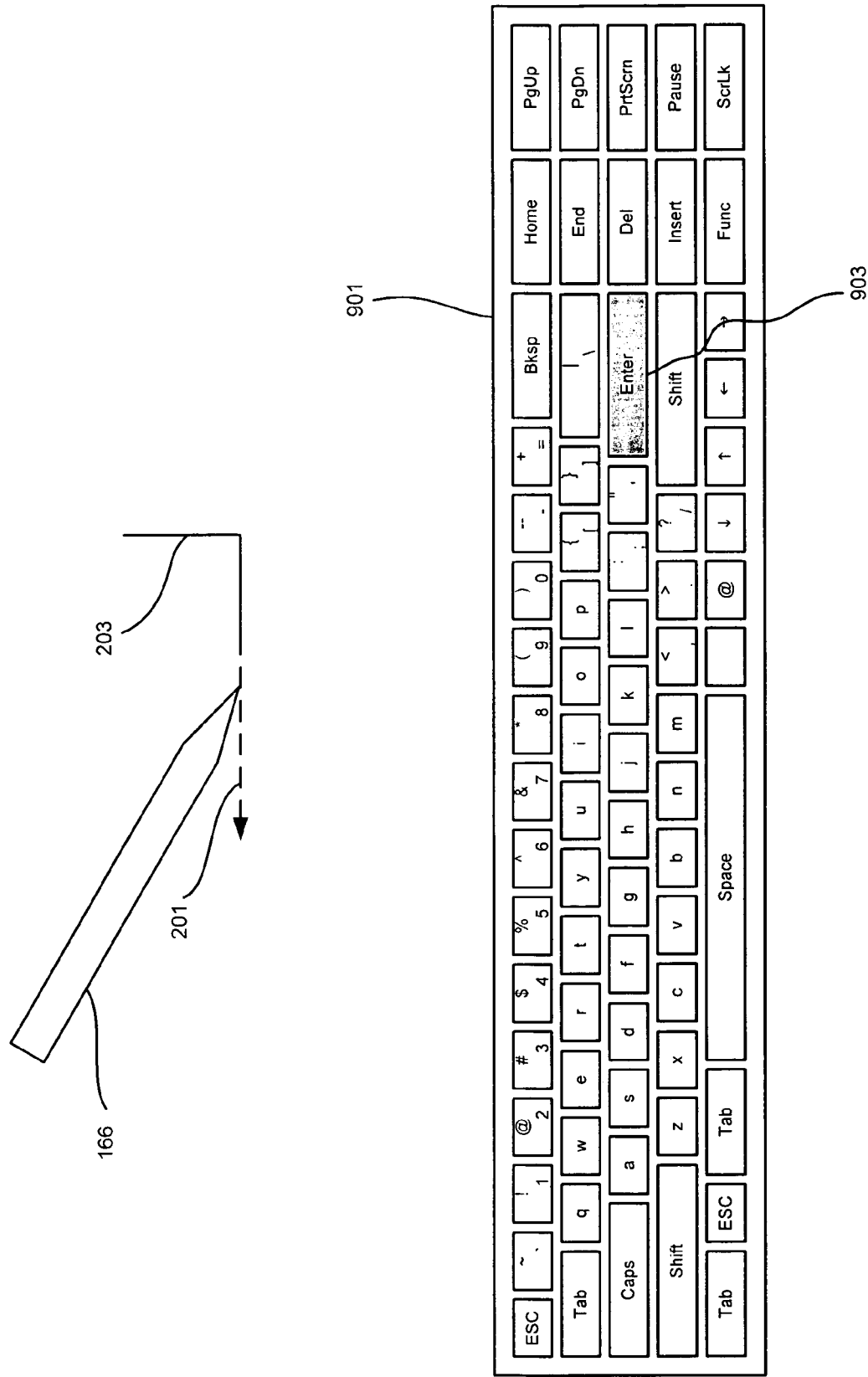

With some embodiments of the invention, the gesture feedback module 313 can even provide gesture feedback in cooperation with other applications or software tools. For example, some stylus-based computers provide the user with an input user interface that allows the user to create text data with the stylus. Thus, this type of computer may provide the user with a text input panel 901 as shown in FIG. 9. As seen in this figure, the text input panel may display many of the keys found on a conventional keyboard, such as an "Enter" key 903. Accordingly, if a user makes a gesture representing a command that is also represented by a key in the text input panel 901, the gesture feedback module 313 may distinguish the appearance of a key corresponding to a recognized gesture. With the illustrated embodiment, the user has employed the stylus 166 to generate handwriting data 203 corresponding to a "♪"-shaped gesture 201 representing a command to enter data. In response, the gesture feedback module 313 may change the shade, color, or other appearance feature of the "Enter" key 903 as shown in FIG. 9.

Figure 10:
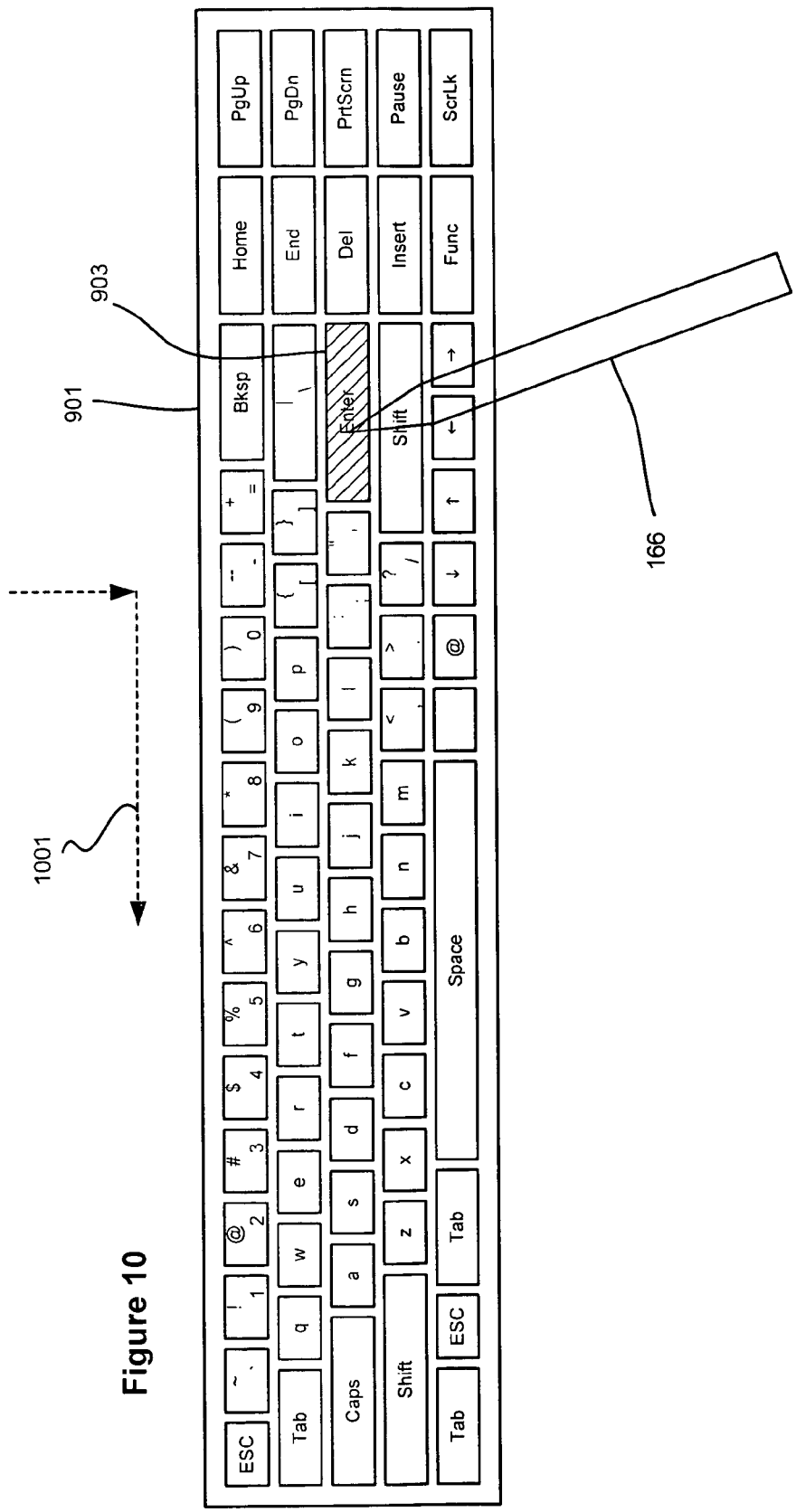

Still further, some embodiments of the invention may employ gesture feedback to assist a user in making a proper gesture. For example, if a user is employing a stylus 166 with a text input panel to submit data, the gesture feedback module 313 may display ideal gestures in response to the activation of keys on an input user interface. Thus, if a user employs the stylus 166 to activate the "Enter" key 903 in the text input panel 901, the gesture feedback module 313 may display the corresponding "♪"-shaped gesture 1001 in response, as shown in FIG. 10. This type of gesture feedback may be employed to effectively teach a user the gestures representing different commands, thereby allowing the user to forego using the input user interface to execute those commands in the future.

Figure 11A:
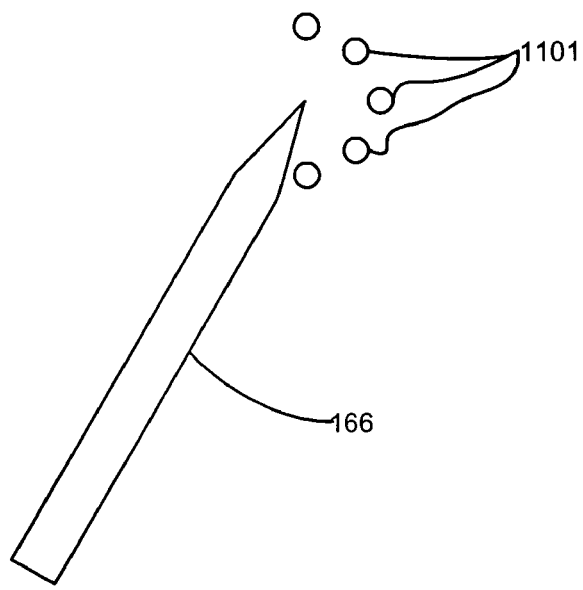
Figure 11B:
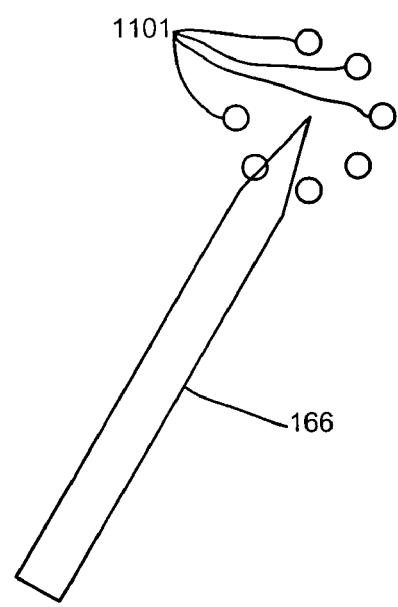

FIGS. 11A and 11B illustrate yet another example of gesture feedback according to various embodiments of the invention. As seen in these figures, a user is employing a stylus to make a "press-and-hold" gesture. More particularly, the user is making a gesture by holding the stylus 166 at a single position on the digitizer 165 for a threshold period of time. This type of gesture may be used, for example, to invoke a menu command (often referred to as a "right-click") for displaying a menu relating to an object displayed at the point of contact between the stylus 166 and the digitizer 165. Initially, the gesture recognition module 307 may not recognize the press-and-hold gesture. As the user continues to hold the stylus 166 in position, however, the gesture recognition module 307 will begin to recognize that the user is making the press-and-hold gesture. In response, the gesture feedback module 313 displays circle images 1101, which are arranged in a ring about the point of contact between the stylus 166 and the digitizer 165.

As the stylus continues to be held in position, the gesture feedback module 313 continues to display additional circle images to complete the ring about the point of contact, as illustrated in FIG. 11B. That is, the number of circles images 1101 making up the ring is proportional to the amount of time that the stylus 166 is held stationary, with the final circle image 1101 completing the ring being displayed just before the gesture recognition module 307 invokes the command corresponding to the press-and-hold gesture. Accordingly, the display of each additional circle image 1101 confirms to the user that the gesture recognition module 307 is continuing to recognize a press-and-hold gesture. Further, each circle image 1101 is displayed at a time increment proportional to the amount of threshold time that the stylus 166 must be held in place before the press-and-hold gesture is invoked. The display of this feedback thus informs the user as to how long the user must continue to hold the stylus 166 in place before the press-and-hold gesture is invoked.

Figure 12:
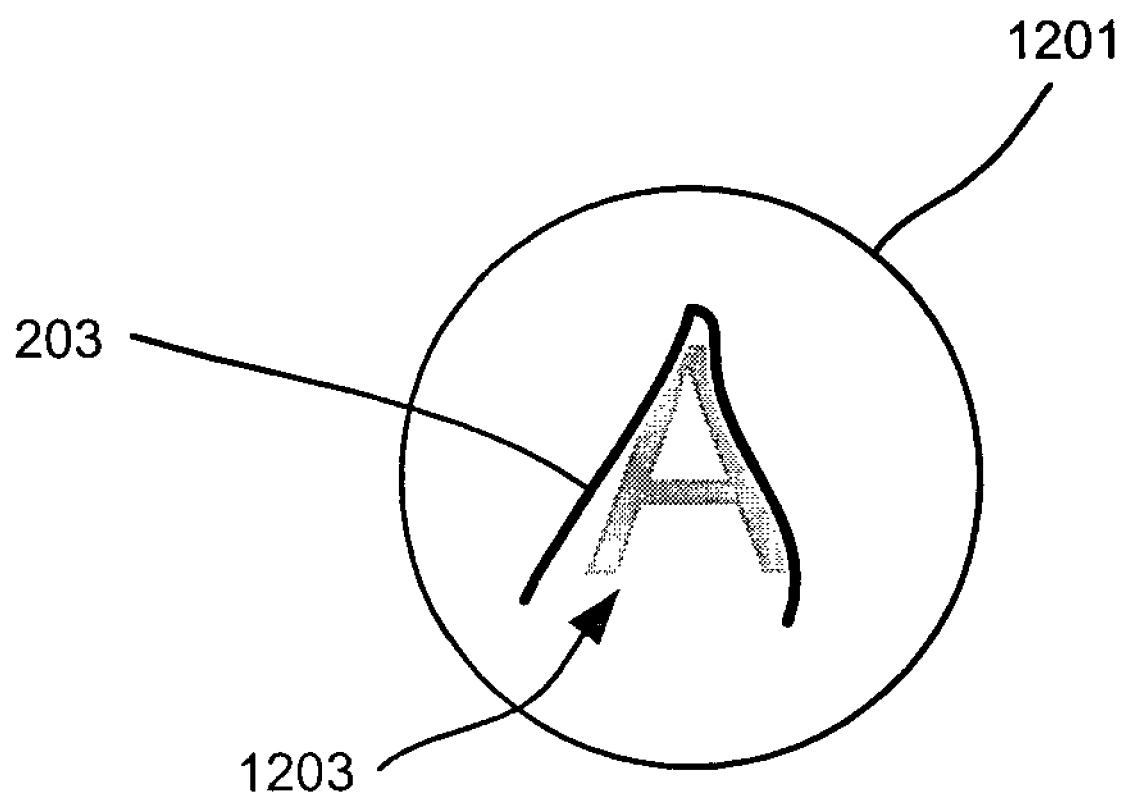

FIG. 12 illustrates still another example of gesture feedback that may be provided according to various embodiments of the invention. As shown in this figure, handwriting input 203 has been written into a gesture recognition user interface area 1201. In the illustrated embodiment, the gesture recognition module 307 has recognized the handwriting input 203 as corresponding to gesture representing a command to generate the text character "A." Accordingly, the gesture feedback module 313 displays the character "A" 1203. It should be appreciated that this type of gesture feedback can be used to confirm the recognition of gestures representing commands to create any number of text characters, and even the commands to create two or more text characters.

CONCLUSION

As discussed above, the gesture feedback techniques according to various embodiments of the invention provide a user with feedback informing the user regarding recognition of one or more gestures. This feedback may advantageously be employed to confirm to a user that a gesture is being correctly recognized. Further, this feedback may warn a user that a desired gesture is not being correctly recognized, allowing the user to cancel the erroneous gesture before it is invoked.

The invention may include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention.

What is claimed is:

1. A method of providing dynamic feedback to a user making a handwriting gesture, the method comprising:
   (i) receiving position data from a pointing device, the position data being produced by the use of the pointing device;

(ii) analyzing the received position data to recognize when the received position data corresponds to a handwriting gesture command;

(iii) if the received position data corresponds to at least one handwriting gesture command, determining that the received position data represents the at least one handwriting gesture command, providing first feedback indicating to a user recognition of the at least one handwriting gesture command, receiving additional position data that does not correspond to the at least one handwriting gesture command, wherein the additional position data and the received position data are produced by a continuous use of the pointing device and wherein the receipt of the additional position data indicates that the recognition of the at least one handwriting gesture is not desired by the user, canceling the determination that the received position data represents the at least one handwriting gesture command; and providing feedback indicating the cancellation;

(iv) if the received position data does not correspond to at least one handwriting gesture command, determining that the received position data does not represent a handwriting gesture command, and automatically providing second feedback indicating to a user that a handwriting gesture command has not been recognized, wherein the second feedback includes passive feedback;

(v) repeating steps (i) through (iv) until no further position data is being received; and (vi) when no further position data is being received, if the received position data has been determined to be representing a single handwriting gesture command, invoking the single handwriting gesture command.

2. The method recited in claim 1, further comprising: recognizing that initially received position data corresponds to a plurality of handwriting gesture commands; and upon recognizing that the initially received position data corresponds to plurality of handwriting gesture commands, providing the first feedback so as to indicate recognition of each of the plurality of handwriting gesture commands.

3. The method recited in claim 2, further comprising: determining a confidence in an accuracy of the recognition of each of the plurality of handwriting gesture commands, and providing the first feedback so as to indicate recognition of the plurality of handwriting gesture commands based upon the determined confidence.

4. The method recited in claim 3, further comprising providing the first feedback by visually rendering an indicator identifying each of the plurality of handwriting gesture commands, such that an appearance of each indicator corresponds to the confidence determined for the accuracy of the recognition of the handwriting gesture command identified by the indicator.

5. The method recited in claim 3, further comprising: analyzing subsequently received position data to determine a second confidence in the accuracy of the recognition of each of the plurality of the handwriting gesture commands; and modifying the second feedback based upon the determined second confidence.

6. The method recited in claim 2, further comprising: analyzing subsequently received position data to recognize a single handwriting gesture command corresponding to the received position data; and providing third feedback indicating to a user recognition of the single handwriting gesture command.

7. The method recited in claim 6, further comprising providing the third feedback so as to delete any indication of recognition of each of the plurality of handwriting gesture commands other than the single handwriting gesture command.

8. The method recited in claim 1, further comprising: recognizing that initially received position data corresponds to a plurality of handwriting gesture commands determining a confidence in an accuracy of the recognition of each of the plurality of handwriting gesture commands such that at least one of the plurality of handwriting gesture commands has a highest determined confidence, and providing the first feedback so as to indicate recognition of only the at least one handwriting gesture command having the highest determined confidence.

9. The method recited in claim 1, further comprising visually providing the feedback to a user, wherein a form of the feedback and a display position of the feedback is based upon the location of the position data.

10. The method recited in claim 9, further comprising visually providing the feedback to the user by including the feedback in at least one transparent window rendered on a display.

11. The method recited in claim 10, further comprising visually providing the feedback to the user by including the feedback in a plurality of transparent windows rendered on a display.

12. The method recited in claim 1, further comprising audibly providing the feedback to a user.

13. The method recited in claim 1, further comprising: visually rendering location information corresponding to the position data on a display; and visually rendering at least the first feedback on the display.

14. The method recited in claim 13, further comprising rendering at least the first feedback at a position on the display relative to a location at which the location information is rendered on the display.

15. The method recited in claim 14, further comprising moving the position at which at least first feedback is rendered on the display relative to changes in the rendering of the location information on the display.

16. The method recited in claim 14, further comprising rendering at least the first feedback at a position on the display relative to a location at which the location information is rendered on the display based upon preference information provided by the user.

17. The method recited in claim 13, further comprising rendering both the location information and at least the first feedback in a character input user interface.

18. The method recited in claim 17, wherein the character input user interface includes a soft Qwerty keyboard, and the first feedback includes a change in appearance of a soft key of the soft Qwerty keyboard corresponding to the at least one handwriting gesture command.

19. The method recited in claim 1, wherein the position data is produced only in response to movement of the pointing device.

20. The method recited in claim 1, wherein the second feedback is a deletion of the first feedback.

21. The method recited in claim 1, further comprising providing the second feedback so as to indicate that the at least one handwriting gesture command is no longer being recognized.

22. A method of providing dynamic feedback to a user making a handwriting gesture, the method comprising:

receiving a first portion of a position data stream from a pointing device, the position data stream being produced by the use of the pointing device to make a handwriting gesture;

recognizing a plurality of handwriting gesture commands corresponding to the received first portion of the position data stream;

upon recognizing that the first portion of the position data stream corresponds to a plurality of handwriting gesture commands, providing feedback indicating recognition of each of the plurality of handwriting gesture commands;

determining a degree of confidence in an accuracy of the recognition of each of the plurality of handwriting gesture commands corresponding to the received first portion of the position data stream, before receiving a second portion of the position data stream, providing feedback to a user indicating recognition of the plurality of handwriting gesture commands, wherein the feedback includes a perceptible indication as to the degree of determined confidence in the accuracy of the recognition of each of the plurality of handwriting gesture commands;

receiving additional position data that does not correspond to the plurality of handwriting gesture commands, wherein the additional position data and the received position data are produced by a continuous use of the pointing device and wherein the receipt of the additional position data indicates that the recognition of the plurality of handwriting gesture commands is not desired by the user;

canceling the recognition of the plurality of handwriting gesture commands; and providing feedback indicating the cancellation.

23. The method recited in claim 22, further comprising, receiving the second portion of the position data stream; and when the position data stream is no longer being received, invoking a handwriting gesture command from among the plurality of handwriting gesture commands recognized from the received position data stream.

24. The method recited in claim 22, further comprising visually rendering an indicator identifying each of the plurality of handwriting gesture commands, such that an appearance of each indicator corresponds to the confidence determined for the accuracy of the recognition of the handwriting gesture command identified by the indicator.

25. The method recited in claim 24, further comprising: receiving the second portion of the position data stream; using the received second portion of the position data stream to determine a second confidence in the accuracy of the recognition of each of the plurality of the handwriting gesture commands; and providing second feedback indicating recognition of the plurality of handwriting gesture commands based upon the determined second confidence.

26. The method recited in claim 25, further comprising: designating that a single handwriting gesture command among the plurality of handwriting gesture commands has a highest second determined confidence, and providing the second feedback by deleting any indication of recognition of each of the plurality of handwriting gesture commands other than the single handwriting gesture command.

27. The method recited in claim 22, further comprising: determining a confidence in an accuracy of the recognition of each of the plurality of handwriting gesture commands such that at least one of the plurality of handwriting gesture commands has a highest determined confidence, and providing the feedback by indicating recognition of only the at least one handwriting gesture command having the highest determined confidence.

28. The method recited in claim 22, further comprising: after providing the feedback to the user, receiving the second portion of the position data stream from the pointing device; analyzing the second portion of the position data stream to recognize a single handwriting gesture command corresponding to the received first and second portions of position data stream from among the plurality of handwriting gesture commands; and providing second feedback indicating to a user recognition of the single handwriting gesture command.

29. The method recited in claim 28, further comprising: receiving a third portion of the position data stream; analyzing the third portion of the position data stream to recognize if the third portion of the position data stream corresponds to at least one of the plurality of handwriting gesture commands; and if the third portion of the position data stream does not correspond to at least one of the plurality of handwriting gesture commands, providing third feedback indicating that a handwriting gesture command is no longer being recognized.

30. The method recited in claim 29, further comprising providing the third feedback by deleting the second feedback.

31. The method recited in claim 29, further comprising providing the third feedback by generating an indicator indicating that the single handwriting gesture command is no longer being recognized.

32. The method recited in claim 22, further comprising visually providing the feedback to a user, wherein a form of the feedback and a display position of the feedback is based upon the location of the position data.

33. The method recited in claim 32, further comprising visually providing the feedback to the user by including the feedback in at least one transparent window rendered on a display.

34. The method recited in claim 33, further comprising visually providing the feedback to the user by including the feedback in a plurality of transparent windows rendered on a display.

35. The method recited in claim 22, further comprising audibly providing the feedback to a user.

36. The method recited in claim 22, further comprising: visually rendering location information corresponding to the position data on a display; and visually rendering the feedback on the display.

37. The method recited in claim 36, further comprising rendering the feedback at a position on the display relative to a location at which the location information is rendered on the display.

38. The method recited in claim 37, further comprising moving the position at which the feedback is rendered on the display relative to changes in the rendering of the location information on the display.

39. The method recited in claim 37, further comprising rendering the feedback at a position on the display relative to a location at which the location information is rendered on the display based upon preference information provided by the user.

40. The method recited in claim 36, further comprising rendering both the location information and the feedback in a character input user interface.

41. The method recited in claim 40, wherein the character input user interface includes a soft Qwerty keyboard corresponding to the at least one handwriting gesture command, and the feedback includes a change in appearance of a soft key of the Qwerty keyboard corresponding to the at least one handwriting gesture command.

42. The method recited in claim 22, wherein the position data is produced only in response to movement of the pointing device.

43. The method recited in claim 22, further including adjusting the feedback responsive to the determined confidence, wherein a degree of confidence is reflected in the feedback.

44. The method recited in claim 22, further comprising: receiving a second portion of the position data stream; analyzing the second portion of the position data stream to recognize if the second portion of the position data stream corresponds to the at least one handwriting gesture command; and if the second portion of the position data stream does not correspond to the at least one handwriting gesture command, providing second feedback indicating that a handwriting gesture command is no longer being recognized.

45. The method recited in claim 44, further comprising providing the second feedback by deleting the first feedback.

46. The method recited in claim 44, further comprising providing the second feedback by generating an indicator indicating that a handwriting gesture command is no longer being recognized.

47. A gesture feedback tool, embodied in computer storage media, for providing dynamic feedback to a user making a handwriting gesture, the gesture feedback tool comprising:
  a gesture recognition module that:
    receives a first portion of a position data stream and a second portion of the position data stream from a pointing device, wherein the first and second portions of the position data stream are produced by use of the pointing device;
    continuously analyzes the received position data stream to recognize when the received position data stream corresponds to a plurality of handwriting gesture commands; and
    in response to recognizing that the first portion of the position data stream corresponds to the plurality of handwriting gesture commands before receiving the second portion of the position data stream, produces position data identifying the plurality of handwriting gesture commands corresponding to the received first portion of the position data stream;
  a gesture confidence module that:
    determines a confidence in an accuracy of the recognition of each of the plurality of handwriting gesture commands corresponding to the received first portion of the position data stream; and
  a gesture feedback module that:
    receives the position data from the gesture recognition module; and
    in response to receiving the position data and based upon the determined confidence, produces feedback for a user corresponding to the plurality of handwriting gesture commands identified by the position data corresponding to the received first portion of the position data stream, wherein the feedback includes a perceptible indication as to a degree of confidence attributable to each of the plurality of handwriting gesture commands;
    receives additional position data that does not correspond to the plurality of handwriting gesture commands, wherein the additional position data is received via an uninterrupted use of the pointing device and wherein the receipt of the additional position data indicates that the recognition of the plurality of handwriting gesture commands is not desired by the user;
    cancels the recognition of the plurality of handwriting gesture commands;
    provides feedback indicating that the plurality of handwriting gesture commands are no longer recognized.

48. The gesture feedback tool recited in claim 47, wherein the gesture recognition module includes a neural net.

49. The gesture feedback tool recited in claim 47, wherein the gesture recognition module includes a recognizer for recognizing that the received position data corresponds to at least one handwriting gesture command based upon heuristics.

50. The gesture feedback tool recited in claim 49, wherein the gesture recognition module includes a neural net.

51. The gesture feedback tool recited in claim 47, wherein the received position data is associated with pointing locations on a display; and the gesture feedback module includes a position calculation module that visually renders the feedback on the display relative to the pointing locations.

52. The feedback tool recited in claim 51, wherein the position calculation module visually renders the feedback on the display relative to the pointing locations based upon the location of the position data.

53. The feedback tool recited in claim 47, wherein the gesture feedback module includes a layered window management module that renders the feedback in a user interface.

54. The feedback tool recited in claim 53, wherein the layered window management module renders the feedback in a character input user interface.

55. The feedback tool recited in claim 53, wherein the layered window management module renders the feedback in one or more transparent windows.

56. The feedback tool recited in claim 47, wherein the feedback reflects the confidence in the accuracy of the recognition of each of the plurality of handwriting gesture commands.

* * * * *